INVENTOR
W. H. SCHEER
BY William F. Simpson
ATTORNEY 3,440,354

TRAFFIC CONTROLLED SWITCHING CIRCUITRY FOR LIMITING ACCESS TO A GROUP OF COMMUNICATION PATHS

William H. Scheer, Granville, Ohio, assignor to Bell Telephone Laboratories, Incorporated, New York, N.Y., a corporation of New York Filed June 14, 1965, Ser. No. 463,599
Int. Cl. H04m 3/38; H04q 3/64
U.S. Cl. 179—18 12 Claims

ABSTRACT OF THE DISCLOSURE

A circuit is disclosed for limiting access to common equipment by a group of lines. A counter is employed which is incremented each time a call is initiated over the common equipment by one of the lines of the group. Call termination is not used to reduce the count. Rather, the counter is decremented at predetermined time intervals, representative of average holding time for calls within the group. When the stored count reaches the maximum allowable, access of the group is barred until the counter is decremented.

This invention relates to communication switching systems and more particularly to controlling and limiting the access of certain subscriber's lines or trunks to the switching system or to various trunks or communication paths or equipment thereof.

In accordance with the prior art, PBX subscribers may communicate one with another through the PBX switchboard or switching equipment. A plurality of trunks is provided between the PBX switching equipment or switchboard and the central office to which it is connected. The number of trunks provided in the PBX trunk group is calculated depending upon the calling rate, the average holding time of the various trunks, and the grade of service which the customer desires to have.

In U.S. Patent 3,253,088 of D. R. Fisher, E. J. Gesing, F. H. Koster and R. J. Kowalinski, issued May 24, 1966, a different kind of PBX arrangement is provided. As shown in this patent application each of the PBX subscriber's lines or stations terminates in a central switching office in the same manner as the usual telephone subscribers' lines. These lines, however, are given a special class of service which permits the various lines to be interconnected one with another by central switching equipment in response to any desired number of digits dialed by the various PBX subscribers. The number of digits required may be equal to or less than those required by the individual subscribers connected to the central telephone or communication switching office or system.

Provision is also made to permit any of these subscribers to dial any of the other regular subscribers of the telephone exchange including subscribers reached over outgoing trunks to distant telephone switching centers including toll switching centers.

Thus the PBX subscribers provided with this new type of PBX service have substantially unlimited access to the switching equipment including the other subscribers' lines and the outgoing trunks. So long as the individual PBX subscriber's line is not busy, the switching network is not tied up and all of the desired outgoing trunks are not busy, that subscriber may place a call over the desired trunk to the desired subscriber's station. However, the subscribers to the more usual type of PBX are limited, in the number of calls which they may simultaneously place through the central switching system, to the number of trunks provided between the PBX and the central switching station or system; they pay for only this number of trunks. The subscribers to the new type of PBX service described in the above-identified patent of Fisher et al. may also wish to be charged only for access to the equivalent of a limited number of trunks and not to pay for unlimited access to all outgoing trunks.

It is an object of my invention to provide an access limiter and controller which will permit a limited number of simultaneous calls between any of the stations of the improved type PBX described above and the remaining subscribers of the central switching system. It will also permit substantially unlimited service, i.e., unlimited number of simultaneous calls, between the various subscribers of the PBX.

In accordance with my invention a counter circuit is provided for each class of call over each group of lines, trunks, circuits or apparatus, the access of which it is desired to limit or control. One is added to the count registered in the counter in response to each of a plurality of calls over the lines, circuits, trunks or apparatus of the group. One is subtracted from the count registered in the counter after each of a predetermined recurring interval of time, the length of the interval being related to the average holding time of the calls over the lines, trunks, circuits or apparatus of the group. When the count in the counter exceeds a predetermined value representative of the number of simultaneous calls to be limited over the group, additional calls over the lines of the group are not completed even though idle circuits may be available. Instead, busy tone, busy announcement or other signal is returned to the subscriber or operator.

It is a feature of my invention that access to a group of lines, trunks, or other circuits is determined by a counter circuit which is incremented on each seizure of such circuit and is decremented at recurring time intervals predetermined on the basis of average circuit holding time.

It is another feature of my invention that circuitry responsive to the counter inhibits establishment of additional connections to such circuits upon the counter exceeding a predetermined sum.

The specific embodiment of my invention described herein is arranged to cooperate with a crossbar switching system. Another feature of my invention relates to preventing the change of the indication of the number of simultaneous calls over the group to a marker circuit during the time that the marker circuit is busy. This feature prevents a change in the indication to the marker should the marker circuit start to establish a call over the group when another marker has just completed the establishment of the last of the simultaneous calls permitted.

Another feature of my invention relates to adding "1" to the count registered in the counter in response to both originating and terminating calls over the group of trunks, lines or circuits being controlled.

The foregoing and other objects and features of the invention may be more readily understood from the following description when read with reference to the attached drawing, in which:

FIGS. 1 and 2, when arranged as shown in FIG. 3, show an exemplary embodiment of my invention and the manner in which it cooperates with a typical automatic switching system; and FIGS. 4 through 10, inclusive, when arranged as shown in FIG. 11, show the circuit details of an exemplary counter and the manner in which "1" is added to and subtracted from the counts registered in the counter in response to the establishing of calls over the respective line or trunk groups or other apparatus or transmission circuits. More precisely:

Figure 1:
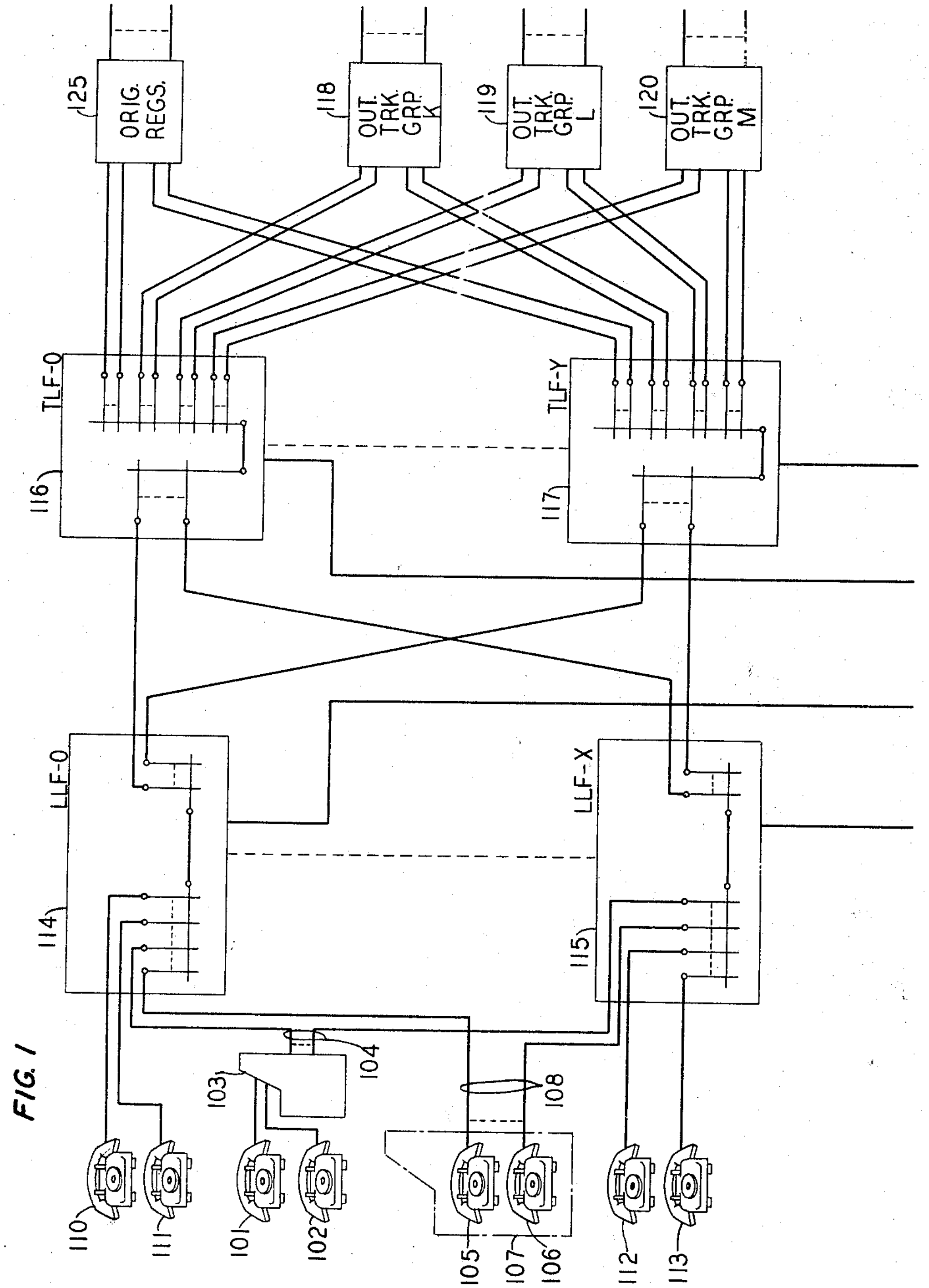
Figure 3:
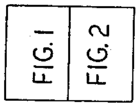
Figures 2, 11:
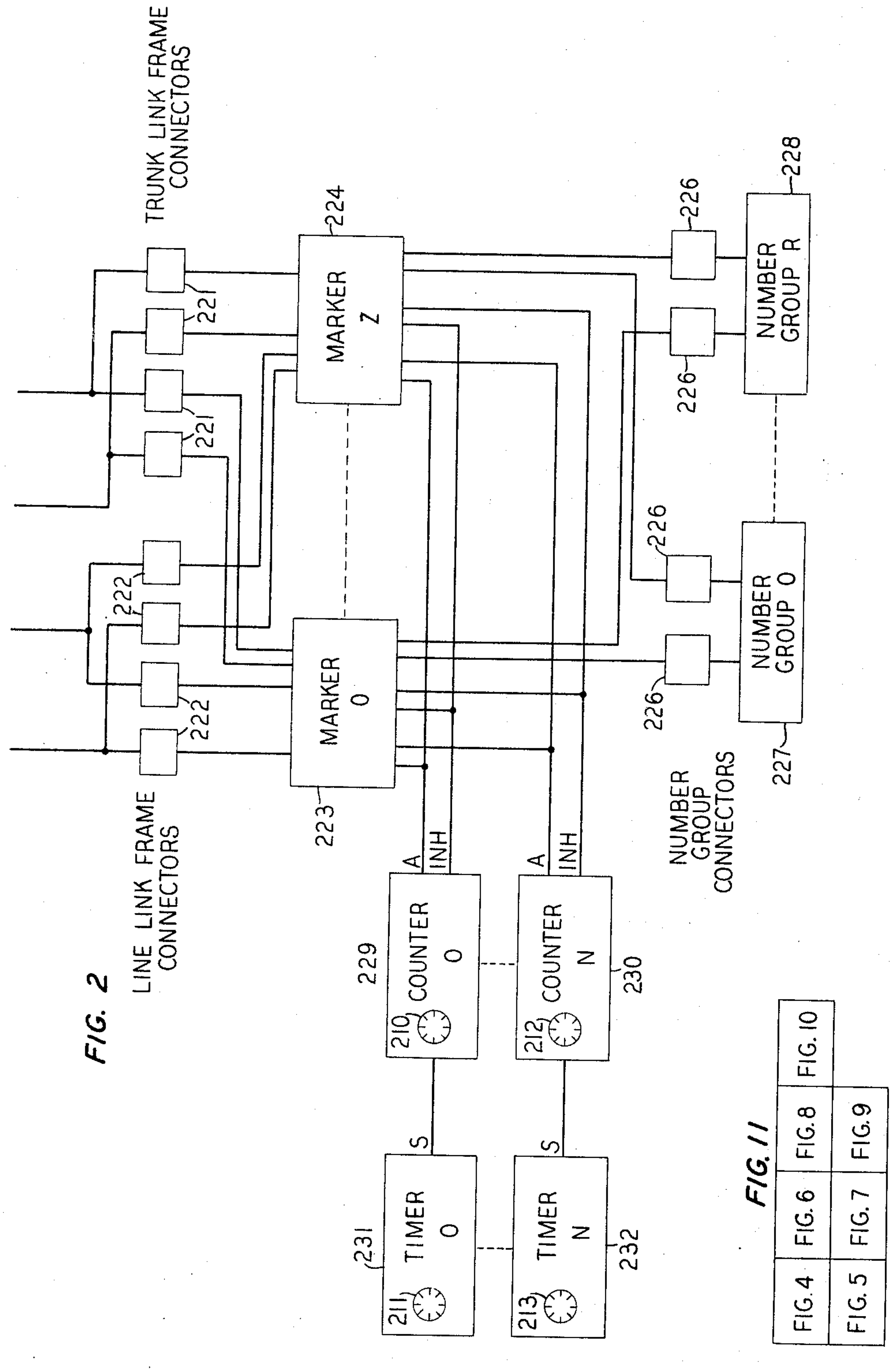

FIGS. 1 and 2, when arranged as shown in FIG. 3, show in block diagram form the various elements of a typical crossbar switching system with which the exemplary embodiment of my invention described herein is arranged to cooperate.

The various elements of such a typical crossbar switching system together with other elements of such systems, are described in U.S. Patents 2,585,904, granted to A. J. Busch on Feb. 19, 1952, 2,535,661, granted to A. O. Adam, Jr., and R. C. Avery on Dec. 26, 1950, and 2,587,817, granted to A. J. Busch and H. J. Michael on Mar. 4, 1952. The elements of such systems shown in FIGS. 1 and 2, as well as other elements of such systems described in the above-identified patents, but not shown in FIGS. 1 and 2, all operate in substantially the manner described in one or more of the above-identified patents. The elements of such systems not shown in FIGS. 1 and 2 are nevertheless present when desired or necessary, and operate in their usual manner.

Such systems comprise line-link frames such as 114 and 115 and trunk-link frames such as 116 and 117 and interconnections between the crossbar switches on these various frames. The subscriber lines, such as 110 and 111, 112 and 113, are connected to the various line-link frames 114 and 115. Originating registers 125 as well as groups of outgoing trunk circuits such as 118, 119 and 120 are connected to the trunk-link frames. In addition intra-office trunks are also connected to the trunk-line frames as described in one or more of the above-identified patents. Such trunks are not shown or represented in FIGS. 1 and 2. In addition, the crossbar switches on the line-link frame are interconnected with the crossbar switches on the trunk-link frames in their usual manner. Markers such as 223 and 224 are employed to control the establishment of connections through the crossbar switches on the various frames. Number group circuits such as 227 and 228 are employed by the marker to determine the line location and to permit the establishment of terminating calls to the various subscribers' lines and stations. In addition, the various connectors such as line-link frame connectors 222, trunk-link frame connectors 221 and number group connectors 226 are provided to interconnect the various circuits with the markers as required in the establishment of the various calls through the crossbar switches located on the line-link frames and the trunk-link frames. A typical PBX 103 is interconnected with the crossbar switches on the line-link frames 114 and 115 in the same manner that the subscribers' lines from the subscribers' stations 110, 111, 112 and 113 are interconnected with these crossbar switches. The PBX 103 is shown connected to two typical PBX stations 101 and 102. This PBX 103 may be of any suitable type either manual or usually a dial-controlled automatic PBX. The PBX stations 101, 102 may be interconnected one with the other without employing the trunks 104. However, when it is desired to make a call from some one of the PBX stations such as 101 to another telephone subscriber reached through the main telephone switching center, shown in FIGS. 1 and 2, then the PBX station such as 101 is first interconnected through the PBX 103 with one of the trunks 104 to the central switching station. Thereafter, this trunk is interconnected with the desired or called subscriber's station or line in the usual manner.

The above-identified patent of Fisher et al. describes a different arrangement providing PBX service for a group of PBX stations. This type of service is sometimes called Centrex service or operation. As described in the above-identified patent, each of the PBX subscriber's stations such as 105 and 106 are provided with an individual line

108 to the central switching equipment shown in FIG. 1 in the same manner as individual subscribers such as 110, 111, 112 and 113. Central office equipment is arranged to respond to any suitable number of digits dialed by these subscribers for interconnecting these subscribers one with another in the same manner that the PBX equipment 103 responds to the various digits dialed by the PBX subscribers 101 and 102. In addition, the central office equipment responds to outgoing calls from the PBX subscribers' stations 105, 106 in the manner similar to that for individual subscribers such as 110, 111, 112 and 113 when desired.

However, in accordance with the arrangement described in said above-identified patent, the Centrex subscribers of a Centrex PBX 107 each have substantially unlimited access to all of the outgoing trunk circuits at the central switching system just as the individual subscribers 110, 111, 112 and 113. However, the PBX subscribers 101, 102, etc. connected to the conventional PBX 103 have a much more limited access to the various outgoing trunk circuits, register circuits, etc. because of the limited number of trunks in the trunk group 104 interconnecting the PBX 103 with the central switching system. Thus, while the subscribers 101 and 102 may communicate freely between themselves, when all the trunks of the trunk group 104 become busy, the subscribers can no longer make a call to some subscriber or station reached through the central switching system shown in FIGS. 1 and 2.

Thus, the service furnished the Centrex PBX 107 subscribers 105 and 106 is superior to the service furnished the PBX subscribers 101 and 102. Frequently, the Centrex PBX subscriber is unwilling to pay for such increased service.

It is therefore an object of my invention to limit the access of such subscribers so that the service furnished them is comparable to the service which may be furnished to PBX subscribers for which they are willing to pay.

In accordance with an exemplary embodiment of my invention, each trunk group, such as 108, extending to the stations of a Centrex PBX, such as 107, is provided with a counter such as counter 229. This counter in turn has a timer associated with it, such as 231. The counter 229 is interconnected with the various markers 223 and 224 as shown in FIG. 2. This counter is capable of increasing or decreasing its stored count by one digit at a time, that is, adding "1" to the count registered in the counter when a pulse or signal is applied to the add lead A and counting down "1" or subtracting "1" from the count registered in the counter when a pulse or signal is applied to the S lead. When the count registered in the counter 229, for example, exceeds a predetermined number then a signal will be applied to the INH lead extending from the counter to all of the markers in a marker group. If any marker should attempt to establish a call over any of the lines 108 when the signal is applied to the INH lead, a busy tone will be transmitted to the calling subscriber or over the trunk, provided the call is between the subscriber and some trunk or other subscriber of the central switching station. If, on the other hand, the call is from some one station such as 105 to another one of the Centrex PBX stations such as 106, then this call will be established in the normal fashion for intra-PBX calls independently of the count registered in the counter.

Various checking and testing features are provided. When a marker is in the process of establishing a connection through the switching network, it will not recognize the application or removal of a signal to the INH lead until it goes normal. If there was no signal on this lead at the beginning of the interval, then the marker will recognize no such signal change during the establishment of the connection. If, on the other hand, there was a signal on this INH lead, when the marker started to establish a connection, then the marker has the INH signal locked-in so that if the call is of the class or type and over the group of lines or trunks to be limited the marker responds and causes a busy tone or other desired signal to be transmitted to the calling station even though there are idle lines or circuits available and the counter circuit 229 is actuated to remove this signal during this time interval that the marker is establishing the call.

In accordance with an exemplary embodiment of my invention, each counter is adjusted to apply an INH signal to all of the markers when a count corresponding to the number of simultaneous calls of the specified class permitted between the PBX and the central office is reached. In addition, the timer 231 is set by the manual setting device 211 which may be one or more dials or one or more keys so that a subtract pulse is applied to the counter at predetermined intervals. Thus, the timer or counter 231 may be considered as a subtract pulse generator. These intervals are related to, although not necessarily equal to, the average holding time of the calls between the PBX stations such as 105 and 106 and other stations not in the PBX reached through the central switching station.

One such counter 229 or 230 is provided for each class of call to be limited over each group of trunks or other circuits whether they be incoming or outgoing trunks or intraoffice trunks or toll trunks.

For example, more than one type of call may be transmitted over some of the trunk groups such as 119. If it is desired to limit the number of calls of one class transmitted over this trunk group a counter similar to 229 or 230 would be provided for that class of calls. If it is desired to limit more than one group of calls over a given trunk group, then a counter similar to 229 or 230 will be provided for each of the classes of calls which it is desired to limit over the trunk group 119, or any other trunk group or apparatus in the system.

FIGS 4 through 10, when arranged as shown in FIG. 11, show the details of the various counter circuits and marker circuits and the manner in which these circuits cooperate with each other. In the marker only such portions are shown as are necessary to enable one to understand the manner in which the marker circuits cooperate with the counter circuits and other control circuits in accordance with my invention. Of course, the other marker circuits such as described in the above-identified patents are present and operate in their usual manner.

The relays shown are designated first with a number representing the figure on which the relay winding is shown. The following letters and numbers then characterize the relay and its function. The relay contacts are given the same designation as they relay followed by a dash and then an additional number indicative of a particular contact on the relay. Where the contacts are on a different sheet, this fact will be usually noted in the following description.

Where marker contacts are shown but the relay controlling these contacts is not shown, the contacts will be designated by the marker relay designation followed by a dash and a number indicative of the contacts on this relay. However, since the relay is not shown, the first numeral designating the sheet on which the relay occurs will be omitted.

Figure 4:
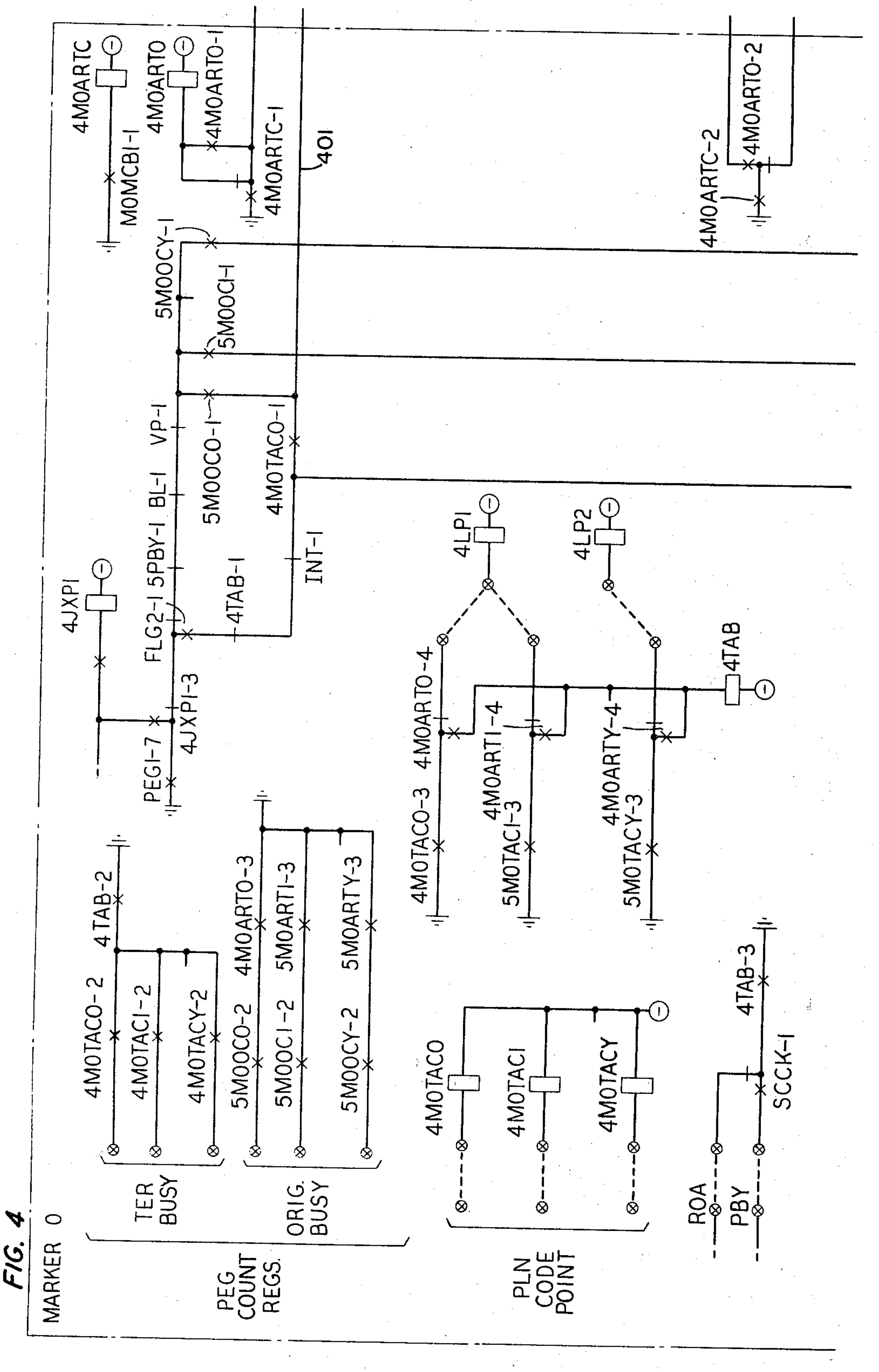
FIGS. 4 and 5 show the exemplary circuits of one marker for controlling a group of counters; such counters are shown in FIGS. 8 and 10, and represented in FIG. 9.
Figure 5:
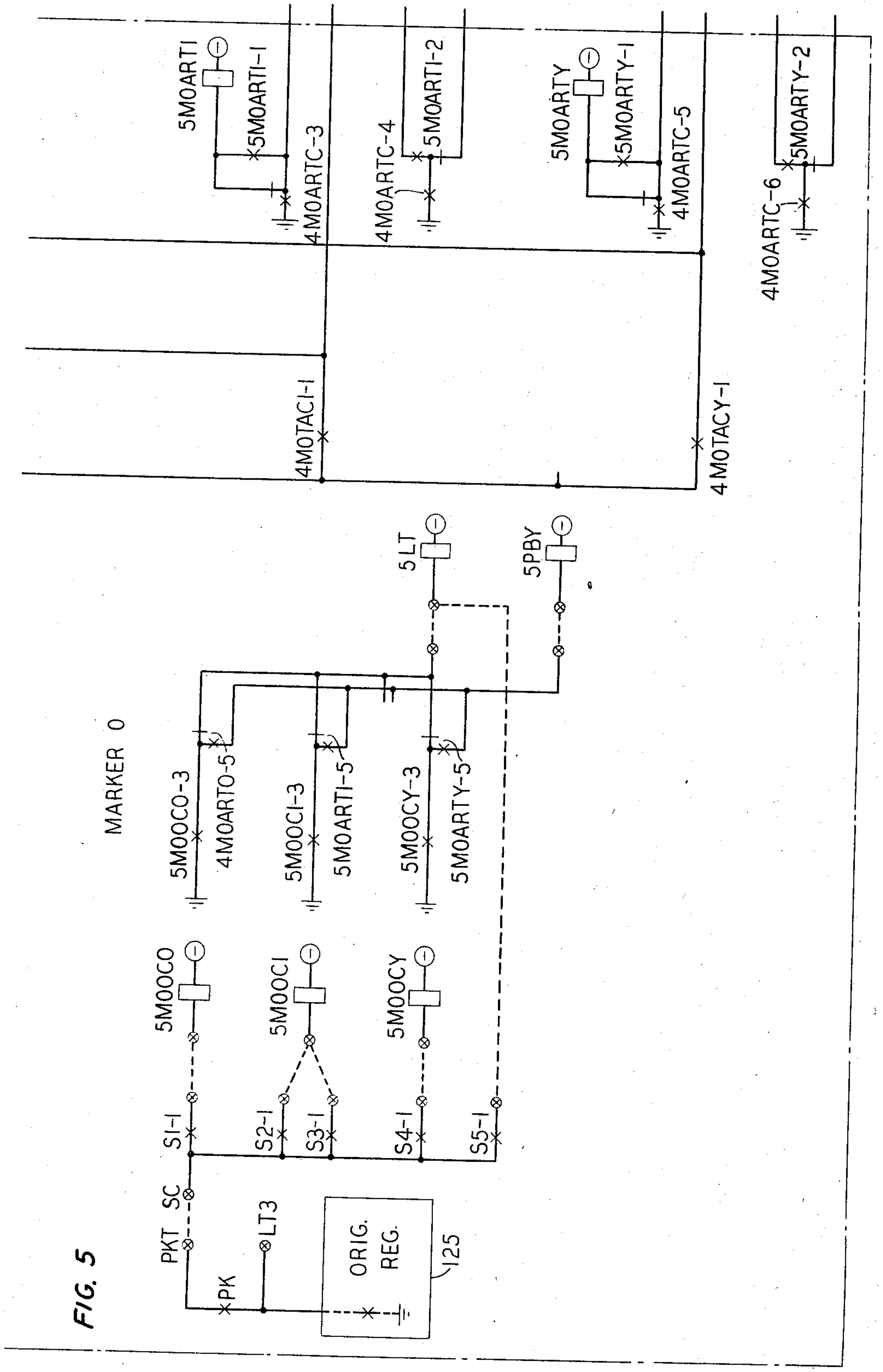
Figure 6:
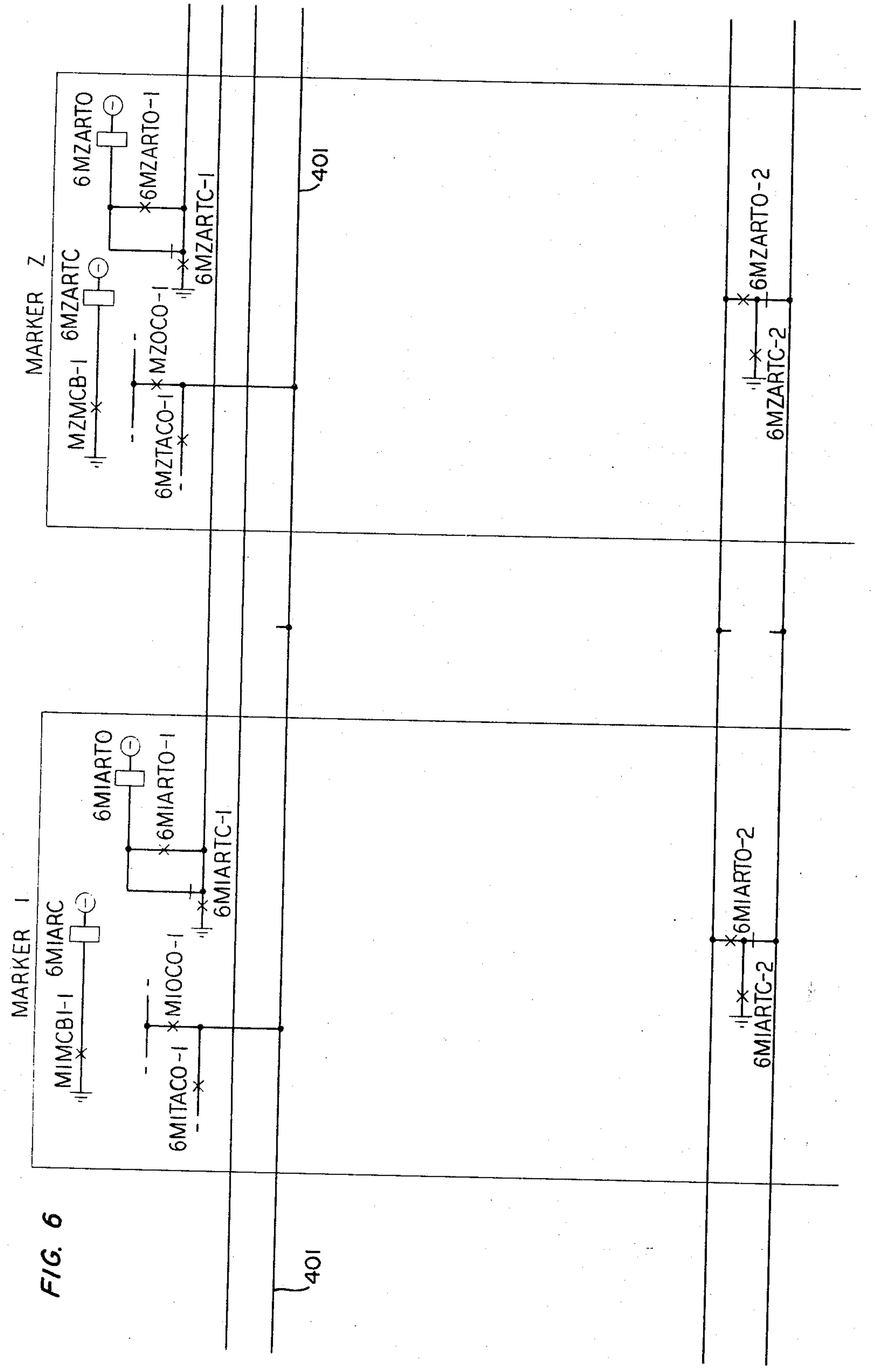
FIGS. 6 and 7 represent additional markers which may control the group counters of FIGS. 8 and 10 and also the additional counters of FIG. 9.
Figure 7:
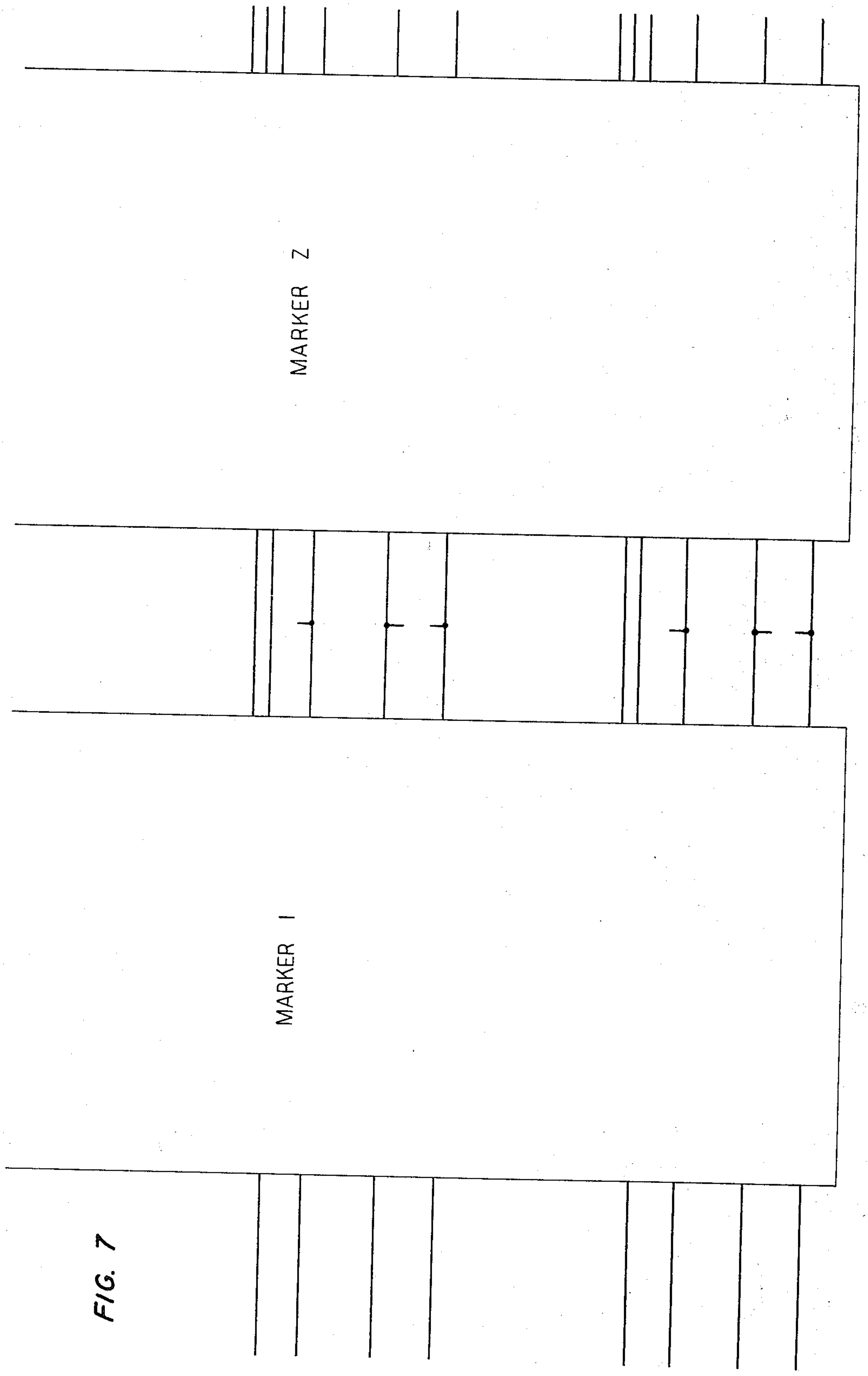

FIGS. 4 and 5 show the detailed circuits of marker 0, for example, which are employed to cooperate with the counter circuit. The left-hand portion of FIGS. 6 and 7 represent similar circuits in marker 1 and the right-hand portion of these figures represent similar circuits in marker Z. The intermediate marker circuits are not represented in the drawing but are similar to those shown in FIGS. 4 and 5, when provided, and are interconnected with each other and with the counter circuit in a manner similar to that shown in FIGS. 4, 5, 6 and 7.

Figure 8:
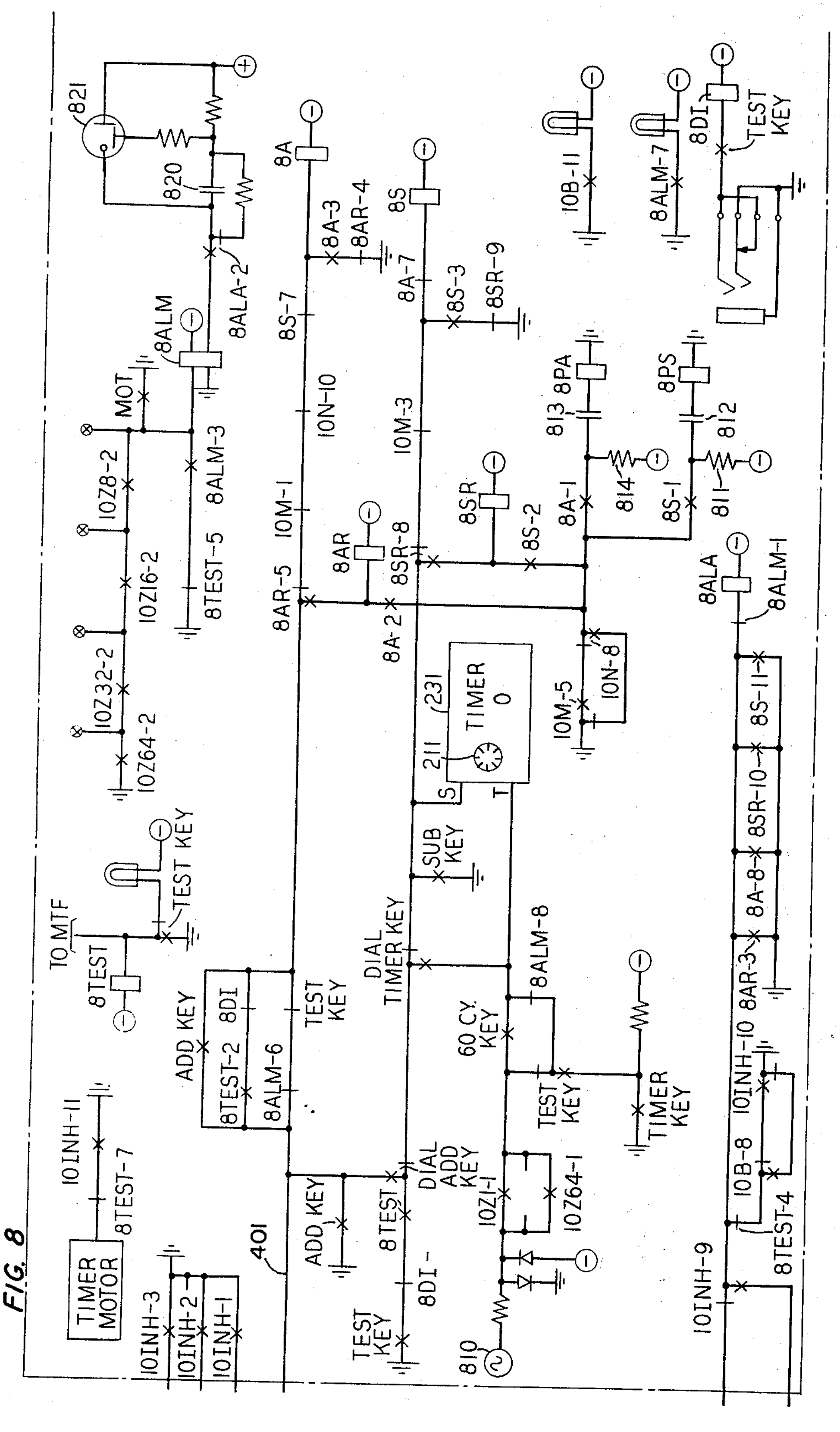
Figure 9:
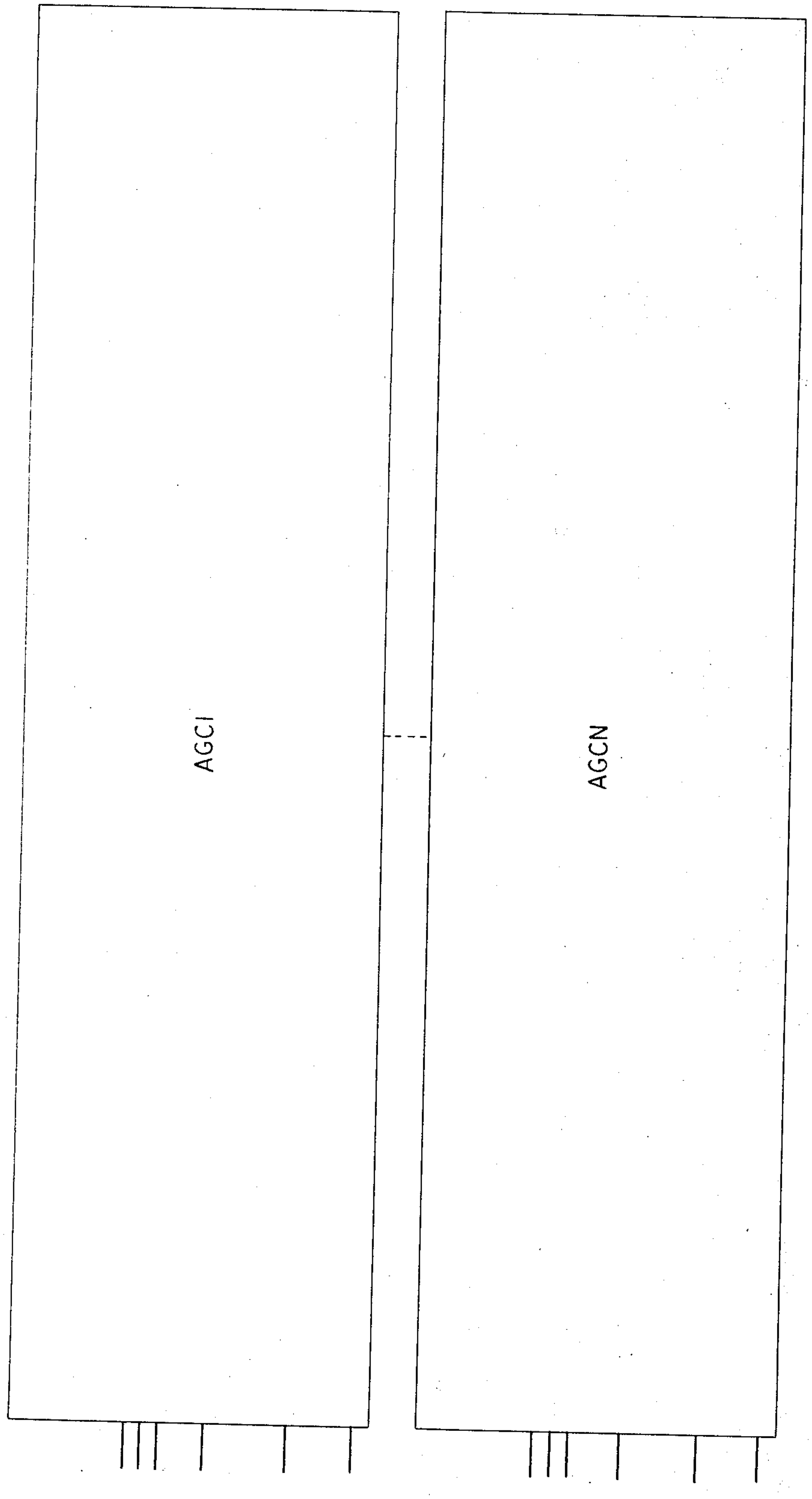
Figure 10:
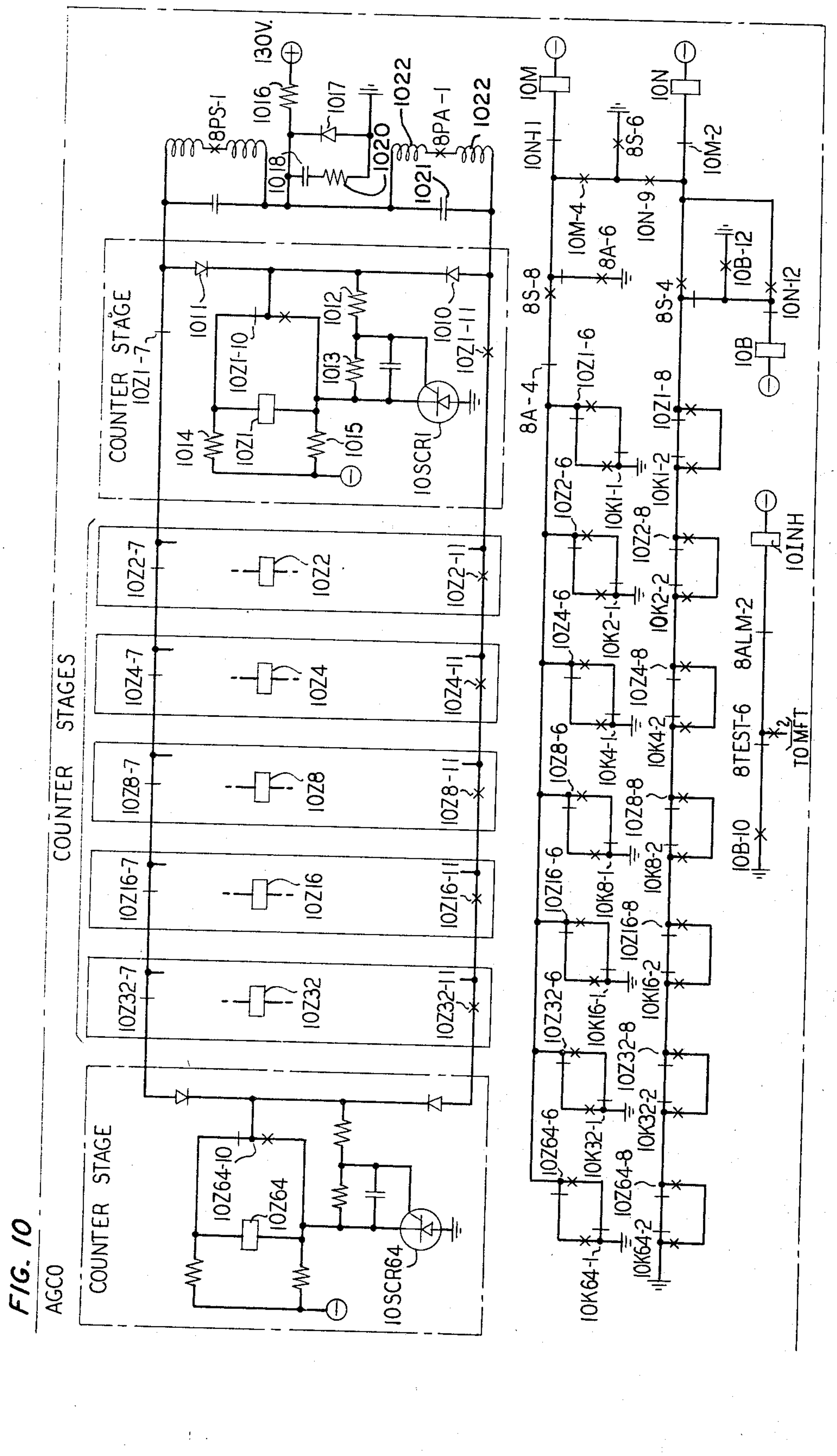

FIG. 10 shows the detailed circuits of a typical counter employed in combination with the control circuits of my invention, and FIG. 8 shows the circuit details of the control circuits interconnecting this counter circuit with the various marker circuits shown in FIGS. 4, 5, 6 and 7. FIG. 9 represents two additional counter circuits 1 and N. Intermediate counter circuits are not shown, but when provided are similar to the counter circuits and the control equipment therefor shown in FIGS. 8 and 10.

While any suitable number of stages may be provided for counting the number of simultaneous calls, the counter shown in the exemplary embodiment of my invention in FIG. 10 comprises seven stages, the first and last stages of which are shown in detail. The intermediate stages are provided with the same circuits as those shown in the first and last stage and are interconnected together in the manner shown. The registering of numbers in the counter is controlled by two relay contacts 8PA–1 and 8PS–1 shown in the right-hand portion of FIG. 10.

Assume first that all of the relays 10Z1, 10Z2, 10Z4, 10Z8, 10Z16, 10Z32 and 10Z64 are released and that the associated semiconductor device such as 10SCR1 and 10SCR64 are nonconducting. These semiconductor devices may be of any suitable type such as silicon-controlled rectifiers. These are well known in the art. When the 8PA–1 contact is closed, "1" is added to the number registered in the counter and when the 8PS–1 contact is closed, "1" is subtracted from the number registered in the counter. As will be described hereinafter, the control circuits are arranged so that both the 8PA–1 and 8PS–1 contacts cannot close simultaneously.

Assume now that all of the counter stages are in their zero states, that is, the relay released and the silicon-controlled rectifier nonconducting and that the 8PA–1 contacts close. At this time a circuit will be completed from the 130-volt source through resistor 1016 and from the upper terminal of condenser 1018, which has also been charged to this 130 volts, through the 8PA–1 contacts and the diode 1010 and then through resistors 1012, 1013 and 1015 to negative battery. When the condenser 1018 discharges and the drop across resistor 1016 is such that the upper terminal of condenser 1018 reaches ground potential then current will flow from ground through the diode 1017 and the operated contacts 8PA–1, diode 1010 and resistors 1012, 1013 and 1015.

Thus, during the discharge time of condenser 1018, an additional pulse of current is transmitted through the above-described circuit and resistors 1012, 1013 and 1015. An additional path exists from the current sources of condenser 1018, resistor 1016 and diode 1017 through the diode 1010 and then through the break contacts 10Z1–10 of the 10Z1 relay and resistor 1014 to negative battery.

The voltage drop across the resistor 1013 in response to the current pulse described above upon the closure of the contacts 8PA–1 initiates a flow of current through the silicon-controlled receifier 10SCR1. Thereafter, the current will flow from ground through this rectifier and resistor 1015 to negative battery independently of the closure of the contacts 8PA–1. The coils 1022 and resistor 1020 are required to limit the initial surge current in contact 8PA–1 to a safe value.

The voltage drop across the resistor 1014 in response to the above-described current from the condensers 1018, resistor 1016 and diodes 1017 and 1010 is substantially equal to the voltage drop across the resistor 1015 and silicon control rectifier 10SCR1 so that relay 10Z1 will not operate in response to this current so long as the contacts 8PA–1 remain closed.

Upon the opening of the contacts 8PA–1 the circuit from the condenser 1018, resistor 1016 and diode 1017 through the diode 1010 and break contacts 10Z1–10 and resistor 1014 is interrupted. Consequently, current may now flow from ground through the 10SCR1 silicon rectifier and in the winding of the 10Z1 relay and resistor 1014 to negative battery, thus causing relay 10Z1 to operate. The operation of the relay 10Z1 opens the break contacts 10Z1–7, closes the make contact 10Z1–11, and operates contacts 10Z1–10 thus conditioning the counter for the next pulse to be applied thereto.

Upon the second closure of the contact 8PA–1, a circuit will be completed through the combination of the condenser 1018, resistor 1016 and diode 1017 through the operated contacts 8PA–1 and then through the diode 1010. Current from this diode then flows through the operated contacts 10Z1–10 of the 10Z1 relay and then through the winding of this relay and resistor 1014 to negative battery thus maintaining the relay 10Z1 operated so long as the contacts 8PA–1 remain closed. Current also flows from the diode 1010 through the operated contacts 10Z1–10 and resistor 1015 to negative battery. The voltage drop across this resistor is such that current will no longer flow through the silicon-controlled rectifier 10SCR1 and as a result this rectifier now ceases to conduct current.

The additional pulse of current caused by the discharge of condenser 1018 is required to overcome the forward voltage drop in diodes 1017 and 1010, and to insure that the voltage across silicon-controlled rectifier 10SCR–1 not only goes to zero but reverses. The forward conduction voltage drop across the silicon-controlled rectifier is less than the voltage drop across diode 1010 and therefore the silicon-controlled rectifier 10SCR–1 cannot be turned off by returning the input to ground.

With relay 10Z1 operated as described above, and contacts 10Z1–11 closed, a circuit path from the contacts of the 8PA–1 relay also extends through the operated contacts 10Z1–11 to the second stage of the counter Z2 and causes the silicon-controlled rectifier thereof to become conducting in the manner described above for the first pulse applied to the counter stage Z1. At the end of the second pulse the contacts 8PA–1 open and interrupt the above-described circuit holding relay 10Z1 operated with the result that this relay releases and releases the contacts 10Z1–11 and closes the break contacts 10Z1–7. Similarly, the relay 10Z2 operates in the Z2 stage of the counter so that the number 2 is now represented in binary notation on the first and second stages of the counter.

The condenser 1021 not only limits the surge voltage across the contacts 8PA–1 but also limits the rate at which voltage can be reapplied to the silicon-controlled rectifier 10SCR–1. If this voltage is applied too rapidly the silicon-controlled rectifier 10SCR–1 will be reoperated causing an incorrect count to be registered.

Upon the next closure of the contacts 8PA–1, the initiation of a flow of current through the 10SCR1 silicon-controlled rectifier is again initiated in the same manner as described above. At this time, however, the 10Z1 relay is released so that contacts 10Z1–11 are open. Upon the termination of this third add pulse the contacts 8PA–1 open and allow the relay 10Z1 to operate. At this time the first stage counter is in its 1 state as is the second stage counter thus indicating a count of 3 registered in the counter. Upon the fourth closure of the contacts 8PA–1 the above-described circuits for maintaining the relay 10Z1 operated and for releasing or interrupting the current flow through the silicon-controlled rectifier 10SCR1 is again closed. At this time the contacts 10Z1–11 are closed as are contacts 10Z2–11. As a result the silicon-controlled rectifier in the Z2 stage of the counter is rendered nonconducting in the same manner as the silicon-controlled rectifier 10SCR1 in stage Z1. In addition, the silicon-controlled rectifier in the Z4 stage of the counter will become conducting in the manner described with reference to the first pulse applied to the stage Z1. When the contacts 8PA–1 again open then the relays 10Z1 and 10Z2 will release, while the relay 10Z4 will operate. Thus, the counter stage Z4 is in its 1 state and the counter stages Z1 and Z2 are in their zero states thus indicating a count of 4 registered in the counter. In a similar manner additional closures of the contacts 8PA–1 are registered in the counter and cause 1 to be added to the number previously registered in the counter.

If the contacts 8PS–1 are closed instead of the concontacts 8PA–1 then the circuits within the individual counter stages operate in the same manner as described above with reference to closure of the contacts 8PA–1 except that current flows from the sources 1018, 1016 and 1017 through the diode 1011 instead of through the diode 1010. However, the succeeding stages are connected to the contacts 8PS–1 through break contacts on the respective Z relays instead of through make contacts. In other words the input to the second stage is connected to respond when the Z1 relay in the first stage is released instead of operated. Similarly, the counter stage Z4 is connected to respond when the Z2 and Z1 relays are both released instead of both being operated as described above with reference to the various closures of the contacts 8PA–1. In this manner 1 is subtracted from the count registered in the counter upon each closure of the contacts 8PS–1 instead of 1 being added to the number registered in the counter upon the closure of the contacts 8PA–1. Assume, for example, that 2 is registered in the counter so that the relay 10Z2 will be operated and the relay 10Z1 released. Then upon the closure of the contacts 8PS–1, the silicon-controlled rectifier 10SCR1 is rendered conducting and the corresponding silicon-controlled rectifier in the second stage of the counter is rendered nonconducting through the break contacts 10Z1–7. Upon the opening of these contacts relay 10Z1 will operate in the manner described above while relay 10Z2 will release. Thus the number registered in the counter has been reduced by 1 from 2 to 1. The various other stages respond in substantially the same manner to the various closures of the 8PS–1 relay, each of which causes 1 to be subtracted from the number registered in the counter.

Each stage of the counter is provided with a key having two sets of contacts designated 10K1–1, 10K1–2, 10K2–1, 10K2–2, 10K4–1, 10K4–2, 10K8–1, 10K8–2, 10K16–1, 10K16–2, 10K32–1, 10K32–2, 10K64–1 and 10K64–2. These keys are set to represent the number of simultaneous calls of the specified class which will be permitted over the trunk group to which this counter is individual. Thus, if three calls are to be permitted, then the key contacts 10K2–1, 10K2–2, 10K1–1 and 10K1–2 are operated while the remaining key contacts are all normal or released.

The first series of these contacts 10K1–1 through 10K64–1 is connected in a circuit with the corresponding Z relay contacts Z1–6 through Z64–6 and these circuits are interconnected with the break contact 8A–4 of the 8A relay. The circuits of these key and Z relay contacts are so arranged that ground will be supplied to the 8A–4 relay contacts so long as any one or more of the key contacts and the corresponding Z relay contacts are in different positions, that is, so long as any one of these pairs of contacts, as for example the key contacts 10K4–1 and the relay contacts 10Z4–6, are not both in their same position, that is, not both either operated or both released.

The second set of key contacts 10K1–2 through 10K64–2 is connected in circuits with the corresponding Z relay contacts 10Z1–8 through 10Z64–8 such that a circuit will be completed from ground through all of these contacts only when each of the pairs of contacts are set in the same condition, that is, either both operated or both released. The circuits through these two sets of contacts are employed to control the relays 10M, 10N and 10B as described hereinafter.

The 8PS relay and its contacts 8PS–1 are controlled by pulses from the subtract counter 231 which are repeated by the 8S relay. This timer may be of any suitable type in which the pulses or signals are obtained at recurring intervals which intervals are readily adjustable by device 211. This device may comprise rotary or other types of switches or other setting means.

In the exemplary embodiment of my invention described herein, this timer is a cycle counter which may be adjusted by means of the adjusting means 211 to count any desired number of cycles and then recycle so that it will again count this number of cycles repeatedly under control of the circuits as will be described herein. Furthermore, in accordance with the exemplary embodiment of my invention described herein, this cycle counter comprises an electronic counter which is arranged to recycle after counting any predetermined number of cycles. Such counters are referred to in Patent 2,407,320, granted to O. R. Miller on Sept. 10, 1946, and 2,433,385, granted to O. R. Miller on Dec. 30, 1947.

In addition, in accordance with my invention, this cycle counter is arranged to count cycles of the 60-cycle power source 810. This source is connected through the contacts 10Z1–1 through 10Z64–1 of the counter relays 10Z1, 10Z2, 10Z4, 10Z8, 10Z16, 10Z32 and 10Z64 of the counter of FIG. 10 described above. Any time any number other than zero is recorded in this counter, one or more of the counter stages will always be in their 1 state so that the corresponding Z relay will be operated. Consequently, some one of the contacts 10Z1–1 through 10Z64–1 will be closed to complete the circuit from the 60-cycle source 810 and then through the break contacts of the test key and break contacts 8ALM–8 of the alarm relay 8ALM to the T input to the counter 231 which causes this counter to count the cycles of the input alternating current. While in the exemplary embodiment described herein, the input to this timer is from a 60-cycle source, it may nevertheless be of any suitable frequency or may be obtained from any suitable oscillator or alternator as may be desired.

After the counter had counted the number of cycles for which it is set it will recycle and start over and again count this number of cycles. Each time a predetermined number of cycles is thus counted, a momentary output signal or pulse is applied to the S output conductor which pulse is then transmitted to the winding of the 8S relay through the break contacts 8SR–8 of the 8SR relay and the break contacts 10M–3 of the 10M relay and break contacts 8A–7 of the 8A relay. Thus, if the 8A and 10M relays are released at this time the 8S relay will be operated by the output or subtract signal from the timer 231.

The operation of the 8S relay opens its break contacts 8S–7 thus preventing the operation of the 8A relay during the time that the 8S relay is operated.

The operation of relay 8S causes its contacts 8S–3 to close and complete a locking circuit for maintaining itself operated from battery through its winding, the break contacts 8A–7 of the 8A relay, the operated contacts 8S–3 of the 8S relay and the break contacts 8SR–9 of the 8SR relay to ground.

The operation of the 8S relay causes its contacts 8S–8 shown in FIG. 10 to operate. The operation of these contacts together with ground through the key contacts 10K–1 through 10K64–1 and the corresponding Z relay contacts 10Z1–6 through 10Z64–6, assuming that one or more of these pairs of contacts are in opposite states or conditions, i.e., not both operated or both released, completes a circuit for the operation of relay 10M in a circuit from the break contacts 8A–4, the operated contacts 8S–8 and the break contacts 10N–11 to battery through the winding of relay 10M. Relay 10M, in operating, closes its contacts 10M–4 and completes a locking circuit for maintaining itself operated from battery through its winding and break contacts 10N–11, the operated contacts 10M–4 and the operated contacts 8S–6. The operation of relay 10M also opens its contacts 10M–2 prevening the operation of the relay 10N.

The operation of relay 10M and the operation of relay 8S completes a circuit from ground through the operated contacts 10M–5, the normal contacts 10N–8 shown in FIG. 8 and then through the operated contacts 8S–1 to the left-hand terminal of condenser 812. The left-hand terminal of this condenser was previously charged to battery voltage through the resistor 811. Consequently, when ground is aplied to this terminal of condenser 812 it discharges through the winding of relay 8PS thus causing this relay to momentarily operate during the discharge time of condenser 812. The momentary operation of relay 8PS thus causes contacts 8PS–1 of FIG. 10 to momentarily close and transmit a subtract pulse to the counter stages of the access group counter 0 shown in FIG. 10 in the manner described above.

The operation of relays 10M and 8S also completes a circuit for the operation of relay 8SR from ground through the operated contacts 10M–5, the normal contacts 10N–8 and the operated contacts 8S–2 to battery through the winding of the relay 8SR. Relay 8SR in operating causes its contacts 8SR–8 to operate and interrupt the operating circuit of relay 8S and at the same time provide a locking or holding circuit for maintaining itself operated from ground on the S conductor from the timer 231 and the operated contacts 8SR–8 to battery through the winding of the relay 8SR. In addition, the operation of relay 8SR interrupts or opens its break contacts 8SR–9 thus interrupting the locking circuit of relay 8S. Consequently, relay 8S now releases while relay 8SR is maintained operated so long as the timer 231 maintains a ground or subtract signal on the S conductor.

The release of relay 8S at this time causes its contacts 8S–8 and 8S–6 to be restored to their normal condition thus interrupting both the operating and locking paths for relay 10M and permitting this relay to release. Relay 10M in turn causes its contacts 10M–5 of FIG. 8 to release and thus restore the circuits controlled by these contacts to their normal or initial state. The release of relay 8S also causes its contacts 8S–1 to release which in turn together with the release of relay contacts 10M–5 permits the left-hand terminal of condenser 812 to again be charged to battery potential. However, the magnitude of the resistor 811 is sufficiently high so that the charging current for this condenser is insufficient to operate the relay 8PS. In this manner, a 1 is subtracted from the counter stages of FIG. 10 and each of the other corresponding access group counters each time a subtract pulse is obtained from the corresponding timer such as 231.

The release of relay 8S also recloses its break contacts 8S–7 and thus prepares the circuits for the operation of the Add relay 8A.

Upon the removal of ground from the S conductor or the termination of the subtract pulse applied to the S conductor by the timer 231, the above-described holding circuit for relay 8SR is interrupted, allowing this relay to release and partially prepare the above-described circuits for the operation of relay 8S. Upon the reception of the next subtract pulse, relay 8S will reoperate and cause the various circuits to operate in response thereto in the manner described above. This causes one to be subtracted from the sum or number standing in the access group counter shown in FIG. 10.

When all of the counter stages have been restored to zero, that is, when as many subtract signals have been transmitted to the counter as add signals, then all of the contacts 10Z1–1 through 10Z64–1 will open and interrupt the supply of pulses from the source 810 to the counter 231 over the T lead, thus preventing the further action of this counter and causing the counter to be restored to its zero state where it is ready to be used and cause additional S or subtract signals to be transmitted in the manner described above when additional add signals are entered upon the counter of FIG. 10.

Various additional circuits are shown for transmitting test signals at 60 cycles to the counter 231 over the T lead when it is desired to test the counter and the operation of the various circuits and response to the timer described herein.

As described above, the 8S relay is operated through break contacts 8A–7 on the 8A relay and the 8A relay is operated through break contacts 8S–7 on the 8S relay. Thus, these relays cannot be both operated at the same time, one or the other is operated and it prevents the other from operating until the first to operate or receive an operating signal is released. Thereafter the other relay may operate even though the operating signal for the first relay has not terminated.

When a subscriber such as 105 or 110 desires to originate a call, he will remove the handset from the cradle or other support which in turn signals the central office equipment and the central office equipment calls in the marker such as 223. The marker sets up a dial tone connection from the calling subscriber such as 105 through the line link frame such as 114 and the trunk link frame such as 116 to one of the originating register circuits 125. Thereupon, dial tone is returned to the calling subscriber. The operation of the various circuits at this time is more fully described in the above-identified Busch patent. Upon receiving dial tone the calling subscriber will then dial the number of the desired station which is recorded in the register 125. At the time the marker establishes the connection from the subscriber's station 105 to this register, the marker also will cause the line location of station or line 105 to be recorded in this register and also the class of service. In this case it will be a class of service indicating a Centrex PBX line.

After the subscriber has fully dialed the necessary digits to identify the calling station, the originating register 125 will again call in a marker which may be the same or a different marker and transfer to the marker all of the information recorded in this register, that is, the line location of the originating line or station 105, the class of service of this line and the number of the desired station. The marker then responds to this information and will set up a connection from the calling station over the proper trunk and cause the necessary information to be transmitted to and over this trunk or to another local station or return busy or overflow or a reorder signal as may be desired.

When the class of service recorded in the originating register indicates a line or trunk group over which it is desired to limit the access in accordance with my invention, the originating register will apply ground to an LT3 terminal or to a PKT terminal through the operated contacts of a PK relay in the marker. These terminals are shown in FIG. 5 and the originating register 125 is also presented in FIG. 5 as well as in FIG. 1. The PKT terminal will be cross-connected to a screening terminal SC and this terminal is in turn connected to contacts S1–1, S2–1, S3–1, S4–1 and S5–1 on a group of screening relays. These contacts are in turn cross-connected to relays individual to the various groups in which it is desired to limit the access in accordance with my invention. Thus, the screening relay contact S1–1 is cross-connected to the winding of the 5M00C0 relay when the call originates in the zero trunk group such as 108. If the call originated in another trunk group in which it was desired to limit the number of calls under specified conditions, then this contact or contact S2–1 or some other one of the screening relay contacts would be cross-connected to the corresponding group relay 5M00C1 through 5M00CY causing the operation of such relay.

Assume for example that ground from the originating register 125 is transmitted through the PK contact, PKT terminal which is cross-connected to the SC terminal, and then through the S1–1 contact, which in turn is cross-connected to the 5M00C0 relay thus causing this relay to operate and indicate that a call has been originated on the zero trunk or line access group and that it is a call to one of the other stations of the central switching station of FIG. 1 or some other central switching station and not a call to some one of the other lines of the PBX 107. As a result, the contacts 5M00C0–3 close and connect ground to the contacts 4M0ART0–5. If the 10INH relay is released at this time, then as described above, the 4M0ART0 relay will also be released so that the contacts 4M0ART0–5 will be released with the result that ground from the 5M00C0–3 contacts will be transmitted through the break contacts 4M0ART0–5 which contacts are then in turn cross-connected to the 5LT relay. The 5LT relay then operates and causes the marker to advance select, busy test, and establish the connection from the station 105 to the desired trunk or other subscriber's line through the line link frames 114 and the trunk link frames 116 or 117 or other of the trunk link frames in the usual manner.

The closure of the 5M00C0–1 contacts of FIG. 4 together with the closure of the PEG1–7 contacts of the peg count relay in the marker 0 complete a circuit from ground through the operated contacts PEG1–7, the break contacts 4JXP1–3, FLG2–1, 5PBY–1, BL–1 and VP–1 and the operated contacts 5M00C0–1 to lead 401. Lead 401 continues through FIG. 6 to FIG. 8 and then through the 8ALM–6 contacts of the 8ALM relay, the break contacts of a test key and break contacts 8AR–5, 10M–1, 10N–10, and 8S–7 of the respective relays to the winding of the 8A relay, thus causing the relay 8A to operate provided the 8S relay is released and the contacts 8S–7 closed.

The operation of the 8A relay causes the contacts 8A–7 to open and thus prevent the operation of the 8S relay so long as the 8A relay is operated. As described above, only the 8A or the 8S relay may be operated at a time.

The operation of the 8A relay also causes contacts 8A–3 to close and complete a locking circuit for maintaining itself operated from ground through the break contacts 8AR–4 of the 8AR relay and the operated contacts 8A–3 of the 8A relay to battery through the winding of the 8A relay.

The operation of the 8A relay causes contacts 8A–4 (FIG. 10) to open and contacts 8A–6 to close and complete a circuit for the operation of relay 10M from ground through the operated contacts 8A–6, the unoperated contacts 8S–8 and 10N–11 to battery through the winding of relay 10M independently of the number registered in the counter.

The operation of the 8A and 10M relays also causes contacts 8A–1 and 10M–5 to close and connect ground to the left-hand terminal of condenser 813 thus causing this condenser which was previously charged through resistor 814 to discharge through the winding of the relay 8PA, thus operating this relay during the discharge time of the condenser 813. Such momentary operation of the relay 8PA causes contacts 8PA–1 in FIG. 10 to close which in turn causes 1 to be added to the number recorded in the counter shown in FIG. 10.

The operation of the 8A and 10M relays also causes contacts 8A–2 and 10M–5 to close and complete a circuit for the operation of relay 8AR from ground through the operated contacts 10M–5 of the 10M relay, the break contacts 10N–8 of the 10N relay, contacts 8A–2 of the 8A relay, to battery through the winding of the 8AR relay.

The operation of relay 8AR causes contacts 8AR–4 to open and interrupt the above-described locking circuit of relay 8A. In addition the operation of relay 8AR causes the contacts 8AR–5 to be operated with the result that the operating circuit for relay 8A is interrupted and a locking circuit completed for maintaining relay 8AR operated under control of the operating ground and circuit of relay 8A described above from the ground through the operated contacts PEG1–7. Thus, so long as this operating circuit is maintained closed, relay 8AR will remain operated and prevent relay 8A from reoperating. However, once relay 8A releases then relay 8S may be operated in response to a subtract signal and as described above, cause a 1 to be subtracted from the number registered in the counter of FIG. 10.

When the marker circuit has advanced and opened the above-described operating circuit at one of the various contacts shown on FIG. 4, the locking circuit for relay 8AR is interrupted thus permitting this relay to release and in turn preparing the circuit of relay 8A to respond to the next add pulse or signal.

The add relay in each of the other access group counters AGC1 and AGCN represented in FIG. 9 also extend to the marker 0 shown in FIGS. 4 and 5, and have ground applied to them through the corresponding operated contacts for both originating and terminating calls in the manner similar to that described above for the access group counter of FIGS. 8 and 10.

In addition, the circuit for operating relay 8A and the corresponding circuits for operating the corresponding relays in the access group counters of FIG. 9 extend to the other markers such as marker 1 through marker Z. These marker circuits are provided with relays and contacts similar to those described above with reference to marker 0 so that both originating and terminating calls established through the switching network under control of these markers 1 through Z similarly cause 1 to be added in the proper access group counters similar to the counters and the control circuit therefor shown in FIGS. 8 and 10.

If the originating call had been intended for some station of the PBX such as 106 instead of some other station reached through the central switching station, then in response to the dialed code by the calling subscriber 105 the marker circuit, when this code is transferred to it from the originating register 125, may cause relay S5 to operate, the contacts S5–1 of which are cross-connected to the 5LT relay directly so that none of the originating call group relays 5M00C0, 5M00C1, and 5M00CY operates. Alternatively, the other cross-connection terminals may be interconnected with this relay 5LT so the call will be established without checking the number of calls over the trunk group and without causing 1 to be added to the number entered upon the AGC0 counter shown in FIG. 10.

If the call in question had arrived when the prescribed number, or more, calls of the particular class or type were simultaneously in progress over the line group 108, and consequently the 10INH and the 4M0ART0 relays operated as described herein, then the operation of the 5M00C0–3 contacts as described herein now complete a circuit for the operation of the 5PBY busy relay instead of the circuit for the operation of the 5LT relay. Consequently, the marker will cause overflow tone to be returned to the calling subscriber. In addition the contacts 5PBY–1 open and prevent the above-described circuit for the operation of the relay 8A from being completed, thus preventing the addition of 1 to the number registered in the counter of FIG. 10. In addition, contacts 5M00C0–2 and 4M0ART0–3 close and complete a circuit for registering the number of calls directed to the trunk group in question when the maximum number of calls to be permitted were simultaneously in progress over the trunk group.

When an incoming call is received for some one of the stations reached over the lines of group 108, the called station designation is transferred to the marker in the usual manner after having been received over an incoming trunk and stored in an incoming register. When this information is received by the marker, the marker translates the called station designation and selects a code point or terminal designating the line or station called. This code point is then employed to obtain the location of the line in the switching equipment as described in the above patents.

In addition, in accordance with my invention, a code relay is cross-connected to the same code point and operates when this code point is selected. Such an additional relay is designated 4M0TAC0, representing the relay in the zero marker responding to a terminating access group call which may be desired to be limited if there are in progress more than the permitted number of such simultaneous calls over the line group 108 for example. Assume first that the 4M0ART0 relay is released indicating that there are then in progress less than the maximum number of such simultaneous calls to be permitted over the line group 108. Consequently, the closure of the 4M0TAC0–3 contacts of the 4M0TAC0 relay completes a circuit for the operation of the 4LP1 relay, for example, from ground through the operated contacts 4M0TAC0–3 and break contacts 4M0ART0–4 contacts and then over the cross-connection to the winding of the 4LP1 relay. The operation of this relay causes the marker to advance and establish a connection to the desired one of the lines in the line group 108 in the normal manner. At this time on a terminating call the marker will have operated the FLG2 relay thus causing the contacts FLG2–1 to operate. Consequently, with this relay operated, and with the 4M0TAC0 relay operated, a circuit will be completed when the marker operates the PEG1 relay and causes PEG1–7 contacts to close from ground through these operated contacts: the break contacts of relay 4JXP1–3, the operated contacts FLG2–1, the break contacts 4TAB–1 and INT–1, and the operated contacts 4M0TAC0–1 of the 4M0TAC0 relay. The circuit continues over the lead 401 to FIG. 8 and then through the 8ALM–6 contacts, break contacts of a test key, and the 8AR–5, 10M–1, 10N–10 and 8S–7 break contacts to the winding of the 8A relay, thus causing relay 8A to operate (assuming that these relays and in particular relay 8S is released). The operation of this relay causes the circuits to respond as described above for an originating call and causes 1 to be added to the number recorded in the counter of FIG. 10 for this access group.

If the 10INH inhibit relay is operated and the 4M0ART0 relay operated in response thereto, as described above, indicating that the maximum allowable number of such simultaneous calls is already in progress over the line group 108, then upon the operation of the 4M0TAC0 relay described above, the closure of the contacts 4M0TAC0–3 complete a circuit for the operation of the 4TAB relay instead of the 4LP1 relay. This circuit extends from ground through the operated contacts 4M0TAC0–3 and the operated contacts 4M0ART0–4 to battery through the winding of the 4TAB relay. The operation of the 4TAB relay opens its contacts 4TAB1 thus preventing the operation of the 8A relay in the circuit described above. The operation of the 4TAB relay also closes its contacts 4TAB–3 which then completes a circuit through either the operated or released contacts of the SCCK–1 relay contacts to the cross-connection terminals which may be cross-connected to the busy PBY terminal or the reorder terminal R0A so that the marker will then further respond to this call by returning overflow to the calling party or by reordering and advancing to cause a second attempt to complete the call to be made.

In addition, the operation of the 4TAB relay together with the operation of the 4M0TAC0 relay completes an enabling path for a busy register from ground through the operated contacts 4TAB–2 and 4M0TAC0–2 to a terminal. The appearance of ground on that terminal operates a busy register to indicate that the number of calls directed to the trunk group from the other subscribers in the central office is now the maximum number of such calls permitted over the line group 108.

As described above, each of the counter stages of the access group counter of FIG. 10 is provided with a manually operable key and this key is set to represent a maximum number of simultaneous calls of a specified class permitted over the trunk group to which this access group counter is individual thereto. When the first add pulse is registered in the counter the first counter stage Z1 will be set in its 1 state and the contacts 10Z1–1 closed with the result that the subtract timer 231 is set into operation. The circuits otherwise respond to this add pulse and a subtract pulse from the timer 231 in the manner described above.

Assume now that the circuits of the trunk group to which the access group counter of FIG. 10 is assigned become busy so that add pulses will be received faster or more frequently than the subtract pulses. Under these circumstances, the number registered in the counter will increase in proportion to the relative speed of the add pulses and subtract pulses. So long as the number registered in this counter does not equal or exceed the number manually set upon the switches of the respective counter stages, the circuits continue to operate in the manner described above.

Assume that now a sufficient number of add pulses, greater than the number of subtract pulses, has been received so that the counter advances to the number representing one less than the number set on the keys designating the maximum number of simultaneous calls of the specified class to be permitted. Then upon the reception of the next add pulse, assuming a subtract pulse is not received in the meantime, the circuits respond to the operation of the 8A relay in the manner described above which in turn causes relay 10M to operate. The 8PA–1 contacts are also operated and cause one to be added to the number registered in the counter. As a result a circuit is now completed, through the second set of key contacts and the Z relay contacts, from ground through the 10K64–2 key contacts and 10KZ64–8 relay contacts, the corresponding pairs of key contacts and relay contacts including 10K1–2 and 10Z1–8, then through the break contacts 8S–4 of the 8S relay and the break contacts 10N–12 of the 10N relay to battery through the winding of the relay 10B. Relay 10B operates in this circuit and completes a holding or locking circuit from ground through its operated contacts 10B–12, break contacts 10N–12 of the 10N relay to battery through the winding of relay 10B. The operation of relay 10B causes its contacts 10B–10 to close to complete a circuit from ground through these contacts, break contacts 8TEST–6 and 8ALM–2 to battery through the winding of the relay 10INH thus causing this relay to operate. The operation of the 10INH relay causes its contacts 10INH–1, 10INH–2 and 10INH–3 shown in FIG. 8 to be operated and apply ground to the corresponding conductors extending to the various marker circuits. Thus, the contacts 10INH–1 connect ground to the zero marker circuit.

If this marker is idle and the 4M0ARTC relay released, this ground will extend through the 4M0ARTC–1 contacts and cause the operation of relay 4M0ART0 thus indicating that subsequent or additional calls to trunks of the access group zero should be transferred to busy or overflow circuits if calls of the specified class are directed to these circuits. If the marker is busy, then the M0MCB1–1 contacts will be closed and the marker relay 4M0ARTC will be operated. As a result, the break contacts 4M0ARTC–1 will be open so that the 4M0AFT0 relay will not operate so long as the marker is busy. If the particular call on which the marker is busy at this time is directed to this trunk, then the marker will nevertheless complete the call in the usual manner and cause another one to be added to the number registered in the counter of FIG. 10 in the manner described above. Under these circumstances the number recorded in this counter exceeds the number set upon the manually operated keys associated with each stage of the counter. The circuits nevertheless respond in the above-described manner causing the 8A relay to operate and this in turn causes the other relays to operate and one to be added to the counter in the manner described above.

If the marker is idle at the time the 10INH relay operates, then the 4M0ART0 relay operates as described above and then when the marker subsequently becomes busy, the contacts M0MCB1–1 close and cause relay 4M0ARTC to operate and close its contacts 4M0ARTC–1. The operation of these contacts together with the operation of the locking contacts 4M0ART0–1 of the 4M0ART0 relay complete a locking circuit for maintaining this relay operated for the duration of the holding time of the marker on the call on which it becomes busy. As described above, so long as the 4M0ART0 relay remains operated and the marker responds to a call of the specified class or type directed to the zero access trunk group, the marker will direct such calls to overflow or busy or to other prescribed circuits or trunks. If the marker becomes busy on a call directed to this trunk group when the 4M0ART0 relay is operated and during the time the marker is busy on such call, the 10INH relay releases. The 4M0ART0 relay nevertheless remains operated over the locking or holding circuit described above so that the marker will again transfer the call to an overflow or busy indication.

Then when the 4M0ARTC relay releases and interrupts the above-described holding circuit for the 4M0ART0 relay which then releases, subsequent calls directed to this trunk group will be completed in their normal manner under control of the marker.

In a similar manner the 6MIART0 relay in marker 1 and the 6MZART0 relay in market Z respond to the operation of the 10INH inhibit relay in the counter of FIG. 10. In this case the corresponding relay in the marker will operate if the marker is idle; if the marker is busy the relay will be maintained in the condition it was in when the marker became busy. When the marker again becomes idle the relay will respond by either operating or releasing depending upon the operation or the release of the 10INH relay in the counter circuit.

The corresponding relays 5M0ART1 and 5M0ARTY in the zero marker respond in a similar manner to the operation and release of the inhibit relays of the other trunk or line access group counters 1 through N of FIG. 9. The other markers 1 through Z shown in FIGS. 6 and 7 are provided with similar relays which operate in the manner similar to that described above with respect to the 4M0ART0 and 6M1ART0 and 6MZART0 relays.

If the 10INH relay operates, and the marker busy relay 4M0ARTC or the corresponding relays in the other markers remain operated for an appreciable period of time, without the 4M0ART0 relay operating, then a circuit will be completed from the operated 4M0ARTC–2 contacts and the released 4M0ART0–2 contacts shown in FIG. 4 and then through the operated contacts 10INH–9 shown in FIG. 8 of the inhibit relay 10INH and the break contacts 8ALM–1 of the 8ALM relay to battery through the winding of the 8ALA relay causing this relay to operate and indicate an alarm condition. Conversely, should the 10INH relay release, but the 4M0ARTC–2 contacts and the 4M0ART0–2 contacts remain operated for an appreciable period of time, then a similar circuit is completed for the operation of the 8ALA alarm relay thus indicating a trouble condition. Similar alarm circuits and contacts are provided in the other markers 1 through Z for the first or zero trunk group and also for each of the other trunk or line access group counters in each of the markers as indicated in FIGS. 4, 5, 6, 7 and 9.

The operation of the 8ALA relay causes its contacts 8ALA–2 to operate and initiate the operation of a timing circuit comprising condenser 820 and gas tube 821. At the end of the time interval of this timing circuit the alarm relay 8ALM is operated to indicate an alarm condition. This circuit is also provided to indicate other alarm conditions; if any one of the relays 8A, 8S, 8AR, or 8SR remains operated for a period of time exceeding this time interval, then an alarm condition is indicated. Similarly, if relays 10B and 10INH remain in opposite states for such an appreciable period of time, an alarm or trouble condition is also indicated, as provided in the circuits in the lower left-hand portion of FIG. 8.

As described above, under certain circumstances the number registered in the counter of FIG. 10 may exceed the number set on the keys associated with this counter. Assume that the number so entered in the counter does exceed the number indicated by the keys. Then upon the reception of the next subtract pulse, relay 8S operates at which time relay 10M operates and the other circuits operate in the manner described above so that one is subtracted from the number entered in the counter. Each subsequent subtract pulse received will cause one to be similarly subtracted.

When the number of subtract pulses received is sufficiently greater than the number of add pulses received so that the number registered in the counter is equal to the number set upon the keys, then upon the reception of the next subtract pulse contacts 8S–8 operate but at this time all of the pairs of keys and Z relay contacts connected to the 8A–4 relay contacts are in the same condition so that no circuit will be completed for operating relay 10M in the manner described above. Instead a circuit will now be completed from ground through the other series of contacts on the keys and Z relays and through the now-operated contacts 8S–4 and the break contacts 10M–2 of the 10M relay to battery through winding of relay 10N thus causing this relay to operate instead of relay 10M. The operation of this relay closes its locking contacts 10N–9 and completes a locking circuit from ground through the 8S–6 relay contacts, the 10N–9 relay contacts, the 10M–2 contacts to battery through the winding of relay 10N. Relay 10N in operating operates its contacts 10N–12 which interrupt the operating and locking circuit of relay 10B and complete another holding or locking path for relay 10N. Upon the release of relay 10B the above-described circuit for the operation of relay 10INH is interrupted thus allowing this relay to release and indicate to the marker circuits in the manner described above that additional calls of the specified class may be completed over the designated trunk group. The release of relay 10B opens the additional locking path of relay 10N which will then release upon the release of relay 8S whereupon the circuits are restored to their initial condition. The subsequent subtract pulses will then cause the circuits to operate in the manner described above in the absence of any additional add pulses. Thus the circuits respond to the add and the subtract pulses in the manner described and cause the marker to prevent the establishment of calls of a specified class over the access trunk group when the number of calls simultaneously in progress over the trunk group, that is when the number recorded in the access group counter of FIG. 10, for example, exceeds the permitted number set upon the manually controlled keys associated with the respective counter stages of this counter.

The foregoing description of the specific embodiment of my invention shown herein is directed to limiting the calls over an access group of a PBX. However, it is equally applicable to limiting calls of any particular class over any group of outgoing or incoming trunks or over both outgoing and incoming trunks in any particular group. For each class of calls which it is desired to limit over any group of trunks it is necessary to provide an access group counter and control circuits therefor as shown in FIGS. 8 and 10 and to provide the necessary relays and contacts in each of the marker circuits for each of these access control counters as shown in marker circuit 0 indicated for the marker circuits 1 through Z of FIGS. 6 and 7.

It is to be understood that the above-described arrangements are illustrative of the application of the principles of the invention. Numerous other arrangements may be devised by those skilled in the art without departing from the spirit and scope of the invention.

What is claimed is:

1. In a communication switching system a group of communication paths, means for establishing calls over the individual paths of said group of paths, a counter connected to said means individual to said group of paths, means to add one to the count registered in said counter in response to the establishing of each call over a path of said group of paths, means for periodically subtracting one from the count registered in said counter, and means responsive to a count exceeding a predetermined value registered in said counter for preventing the establishing of additional calls over paths of said group of paths.

2. In a communication switching system a group of communication paths, means for establishing different classes of calls over the paths of said group of paths, a counter connected to said means, apparatus and circuits for adding one to the number registered in said counter in response to the establishing of each call of one of said different classes over the paths of said group by said means, means for periodically subtracting one from the number registered in said counter, and means responsive to numbers registered in said counter exceeding a predetermined number for preventing the establishing of additional calls of said one class over the paths of said group of paths.

3. In a communication system in accordance with claim 2 including apparatus and circuits in said establishing means for establishing calls of other of said classes over the paths of said group of paths independent of the number recorded in said counter.

4. A communication system in accordance with claim 2 which includes circuits and apparatus interconnected with said counter for adding one to the number registered in said counter in response to the establishing of each terminating call of said one of said different classes over the paths of said group by said establishing means.

5. A communication system in accordance with claim 2 which includes circuits and apparatus interconnected with said counter for adding one to the number registered in said counter in response to the establishing of each originating call of said one of said different classes over the paths of said group by said establishing means.

6. In a crossbar switching system, a group of communication circuits, a plurality of crossbar switches, marker circuits for establishing paths through said crossbar switches to the communication circuits of said group for different classes of calls, a plurality of counters for counting add pulses and subtracting subtract pulses transmitted thereto connected to said markers, each of said counters being individual to a different one of said classes of calls established through said crossbar switches to the circuits of said group, said markers including means for transmitting an add pulse to the respective counter upon the establishing of a path to said communication circuits for the respective class of call and for periodically subtracting one from the number registered in said counter, and inhibiting means responsive to the registering of a predetermined number in said respective counters for preventing the establishing of additional paths to idle circuits of said group for calls of the respective class.

7. A crossbar switching system in accordance with claim 6 in which said means for subtracting includes a subtract pulse generator for generating subtract pulses at specified recurring intervals connected to each of said counters for transmitting subtract pulses to said counters.

8. A crossbar switching system in accordance with claim 6 in which said marker includes means for establishing paths through said crossbar switches to idle ones of said paths for other classes of calls independent of said inhibiting means.

9. A crossbar switching system in accordance with claim 6 in which said markers include means for transmitting an add pulse to a respective one of said counter circuits in response to the establishing of a path through said crossbar switches to an idle one of said circuits for an originating call of the respective class of service.

10. In a telephone switching system, switching network means, a plurality of outgoing trunks connected to said network means, a plurality of subscriber lines connected to said network means, each of said subscriber lines normally having access through said network means to said outgoing trunks, and means for limiting the number of simultaneous calls a particular group of said subscriber lines may place to other than lines of said particular group, said limiting means including a counter, means to add one to the count registered in said counter in response to the establishing of each call from one of said lines of said group to lines other than said lines of said group and to one of said trunks, means for subtracting one from the count registered in said counter at specified recurring intervals, and means responsive to a count exceeding a predetermined value registered in said counter for preventing the establishing of additional calls involving lines of said group except to other lines of said group.

11. In a telephone system in accordance with claim 10, said add means including means for adding to said count on an originating call from said group of lines to lines other than the lines of said group of lines and means for adding to said count on a terminating call to said group of lines from lines other than the lines of said group of lines.

12. In a telephone system, a group of subscriber lines, means for establishing a first and a second type of communication connection to individual ones of said lines, and means for inhibiting connections of said first type while permitting connections of said second type, said inhibiting means including a counter, means for adding one to said counter on each first type connection to any of said lines of said group, means for subtracting one from the count registered in said counter at specified recurring intervals, and means responsive to said count registered in said counter exceeding a predetermined value for preventing subsequent connections of said first type to any of said lines of said group.

References Cited

FOREIGN PATENTS 1,045,371 10/1966 Great Britain.
1,131,749 6/1962 Germany.

KATHLEEN H. CLAFFY, *Primary Examiner.*

A. H. GESS, *Assistant Examiner.*